United States Patent
Frey

(10) Patent No.: US 11,853,232 B2
(45) Date of Patent: Dec. 26, 2023

(54) DEVICE, METHOD AND COMPUTER PROGRAM

(71) Applicant: Sony Group Corporation, Tokyo (JP)

(72) Inventor: Matthias Frey, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 165 days.

(21) Appl. No.: 17/383,453

(22) Filed: Jul. 23, 2021

(65) Prior Publication Data

US 2022/0035752 A1 Feb. 3, 2022

(30) Foreign Application Priority Data

Jul. 30, 2020 (EP) .................................. 20188734

(51) Int. Cl.
| | | |
|---|---|---|
| *G06F 13/10* | (2006.01) | |
| *G06F 3/14* | (2006.01) | |
| *A63F 13/23* | (2014.01) | |
| *A63F 13/803* | (2014.01) | |
| *A63F 13/245* | (2014.01) | |

(52) U.S. Cl.
CPC ............ *G06F 13/102* (2013.01); *A63F 13/23* (2014.09); *A63F 13/245* (2014.09); *A63F 13/803* (2014.09); *G06F 3/14* (2013.01); *A63F 2300/1025* (2013.01); *A63F 2300/1062* (2013.01); *A63F 2300/8017* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 2002/0108804 A1* | 8/2002 | Park ....................... | B62D 5/005 |
| | | | 180/444 |
| 2018/0040163 A1 | 2/2018 | Donnelly et al. | |
| 2018/0308296 A1* | 10/2018 | Dan ........................ | G07C 5/008 |
| 2019/0049950 A1 | 2/2019 | Poornachandran et al. | |
| 2019/0163263 A1 | 5/2019 | Alaniz et al. | |
| 2020/0331521 A1* | 10/2020 | Oblizajek ............. | B62D 5/0481 |

OTHER PUBLICATIONS

Martin, "Porsche Links Virtual Reality Experience to Car Movements" Connected Thinking, Available Online at: https://www.mediapost.com/publications/article/338231/porsche-links-virtual-reality-experience-to-car-mo.html, Jul. 16, 2019, pp. 1-2.

Holmes "Audi, Disney bring VR Games and Movies into your Car at CES 2019", Road Show, https://www.cnet.com/roadshow/news/audi-disney-holoride-vr-marvel avengers-in-car-entertainment/, Jan. 7, 2019, pp. 1-9.

AUTOSAR, Specification of the Virtual Functional Bus, No. 056, Auxiliary Version 1.3.0, Final Part of Release 3.2 Revision 2, Nov. 14, 2007.

FlexRay Communications System Protocol Specification Version 3.0.1, Oct. 2010, 341 pages.

Chaaban et al., Steer-By-Wire System Development Using AUTOSAR Methodology, ESTACA, Embedded Systems Laboratory, Rue georges Charpak BP76121—53061 LAVAL Cedex 9 firstname.lastname@estaca.fr.

* cited by examiner

*Primary Examiner* — Scott C Sun
(74) *Attorney, Agent, or Firm* — XSENSUS LLP

(57) ABSTRACT

An electronic device comprising circuitry configured to detect and read commands of a x-by-wire system (ECU1, ECU2, 25) from a communication bus (FLR) and to use the commands of the x-by-wire system (ECU1, ECU2, 25) as an input for an electronic gaming or simulation device (30).

13 Claims, 8 Drawing Sheets

DEVICE, METHOD AND COMPUTER PROGRAM

CROSS-REFERENCE TO RELATED APPLICATION

The present application is based on EP application 20188734.6, filed Jul. 30, 2020, the entire contents of which are incorporated herein by reference.

TECHNICAL FIELD

The present disclosure generally pertains to the field of user interfaces for electronic devices, in particular to user interfaces for driving simulations and gaming.

TECHNICAL BACKGROUND

A controller is an electronic input device used with computers or entertainment systems to provide input, e.g. to a video game. Input devices that can act as controllers are keyboards, mice, gamepads, joysticks, etc. There also exist special purpose input devices, such as steering wheels for driving games and light guns for shooting games.

With the increasing computing power available today and the increasing complexity of computer programs, alternative user interfaces are needed.

SUMMARY

According to a first aspect, the disclosure provides an electronic device comprising circuitry configured to detect and read commands of a x-by-wire system from a communication bus and to use the commands of the x-by-wire system as an input for an electronic gaming or simulation device.

According to a further aspect, the disclosure provides a method comprising detecting and reading commands of a x-by-wire system from a communication bus and using the commands of the x-by-wire system as an input for an electronic gaming or simulation device.

According to a further aspect, the disclosure provides a computer program comprising instructions which when, carried out on a processor, cause the processor to detect and read commands of a x-by-wire system from a communication bus and to use the commands of the x-by-wire system as an input for an electronic gaming or simulation device.

Further aspects are set forth in the dependent claims, the following description and the drawings.

BRIEF DESCRIPTION OF THE DRAWINGS

Embodiments are explained by way of example with respect to the accompanying drawings, in which:

FIG. 4 schematically shows an embodiment of a VR head set 31 used in a computing environment as described with regard to FIG. 3a;

DETAILED DESCRIPTION OF EMBODIMENTS

Figure 1:
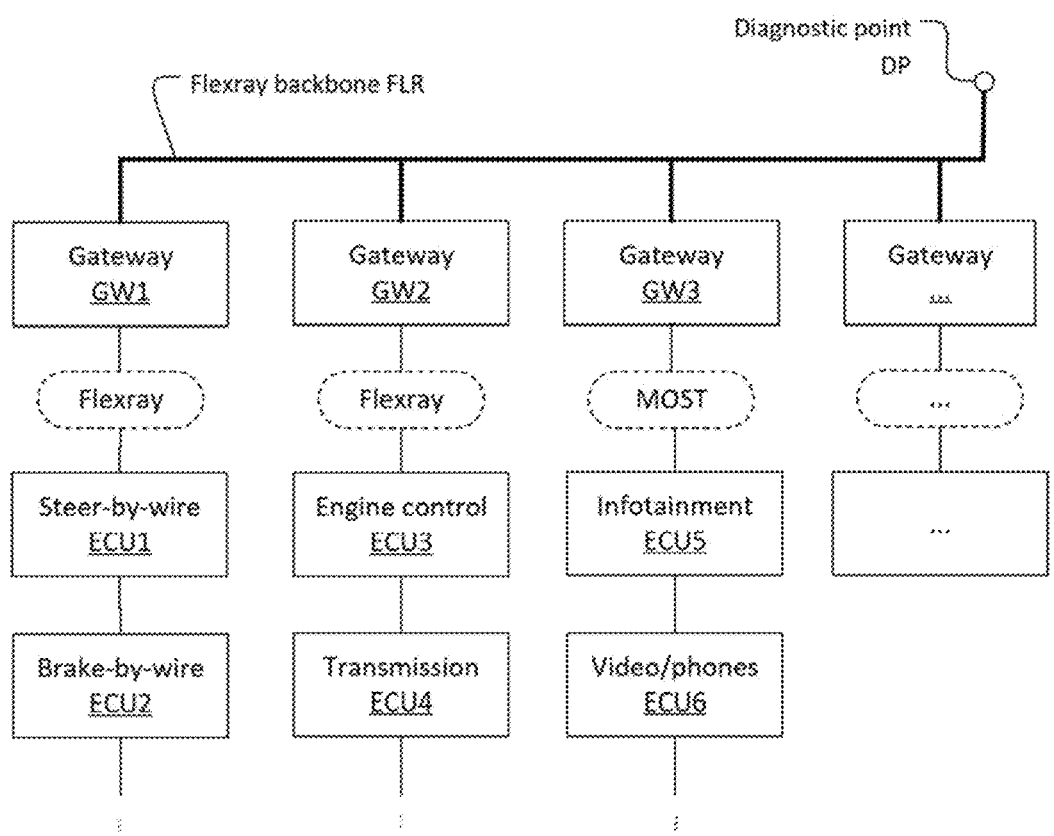
FIG. 1 schematically shows an example of an automotive network that is based on a Flexray backbone.

Before a detailed description of the embodiments under reference of FIG. 1, some general explanations are made.

The embodiments described below disclose an electronic device comprising circuitry configured to detect and read commands of a x-by-wire system from a communication bus and to use the commands of the x-by-wire system as an input for an electronic gaming or simulation device (30).

The circuitry may provide a non-driving mode in which the commands of the by-wire systems are detected and read by the bus connector, and at the same time the vehicle components which are conventionally the recipients of these commands are inhibited from interpreting and executing the commands.

The commands of the x-by-wire system may be used as input for a simulation or gaming environment.

The circuitry may comprise a bus connector configured to detect and read the commands of the x-by-wire system from the communication bus.

The commands of the x-by-wire system may for example be used as an input for a computing environment comprising a AR/VR headset for visual and auditory output, as an input for a computing environment comprising a monitor positioned next to the driver for visual output, as an input for a computing environment comprising a windscreen projector for visual output, and/or as an input for a computing environment comprising dashboard (instrument panel) screens for visual output and/or an in-car sound system for auditory output.

The communication bus is a FlexRay bus. However, the principles of the embodiments may also apply to any other communication bus technologies such as CAN, TTCAN, LIN, MOST, Ethernet, etc.

The x-by-wire system may for example comprise electrical or electro-mechanical systems for performing vehicle functions. For example, the x-by-wire system may comprise a steer-by-wire system (ECU1), a brake-by-wire system (ECU2), or a throttle-by-wire system.

The commands detected and read may for example comprise steering commands which are transmitted to a control unit via a communication bus and which are converted into a movement positioning of the wheels of a car, or braking commands which are transmitted to control unit and converted into a movement positioning of the brake system of a car, or throttle commands which are transmitted to a control unit and converted into activities of the engine/motor system of a car.

The electronic gaming or simulation device may for example be a computational unit of the car, the computational unit of a VR headset, or an external processing unit.

Circuitry may include a processor, a memory (RAM, ROM or the like), a storage, interface technology, input means (mouse, keyboard, camera, etc.), output means (display (e.g. liquid crystal, (organic) light emitting diode, etc.), loudspeakers, etc., a (wireless) interface, etc.), as it is generally known for electronic devices (computers, smartphones, etc.). Moreover, it may include sensors.

The embodiments also disclose a method comprising detecting and reading commands of a x-by-wire system from a communication bus and using the commands of the x-by-wire system as an input for an electronic gaming or simulation device.

The embodiments also disclose a computer program comprising instructions which when, carried out on a processor, cause the processor to detect and read commands of a x-by-wire system from a communication bus and to use the commands of the x-by-wire system as an input for an electronic gaming or simulation device.

The embodiments also disclose a tangible computer-readable medium that stores a computer program comprising instructions which, when carried out on a processor, cause the processor to detect and read commands of a x-by-wire system from a communication bus and to use the commands of the x-by-wire system as an input for an electronic gaming or simulation device.

The embodiments are now described in more detail with reference to the accompanying drawings.

Automotive x-by-wire technology relates to the use of electrical or electro-mechanical systems for performing vehicle functions traditionally achieved by mechanical control systems. Here, "x" stands for the individual use cases such as "drive", "fly", "steer", etc. By introducing x-by-wire systems, electronic control systems using electromechanical actuators and human-machine interfaces such as pedal and steering wheels replace mechanic components such as the steering column, intermediate shafts, pumps, hoses, belts, coolers and vacuum servos and master cylinders. Ever since the "drive by wire" was introduced, the steering wheel has been decoupled from the wheels and the pedals from the engine; with electric cars (e.g., Vision-S) this becomes even more pronounced.

For example, according to the steer-by-wire technology the driver's steering command is received by a control unit via a control line, processed and then transmitted an actuator via a control line, where it is converted into a movement positioning the wheels. In the electronic steering wheel, a motor can be foreseen for simulating the restoring forces on the steering wheel, i.e. for providing a mechanical-like force feedback to the steering. The steer-by-wire technology provides an increased comfort to the driver. That is, the steering column is replaced by communication lines, the driver steers "by wire". Other examples include electronic throttle control ("throttle-by-wire") and brake control ("brake-by-wire").

Electronic communication within a car typically uses a vehicle bus which is a specialized internal communications network that interconnects components, e.g. electronic control units (ECU) inside a vehicle. Special requirements for vehicle control such as message delivery and routing are defined by networking protocols such as Flexray, Controller Area Network (CAN), Local Interconnect Network (LIN), Media Oriented Systems Transport (MOST), and others. On modern cars, FlexRay is used as communication backbone. Flexray supports passive multipoint connections as well as active star connections. Critical devices (steering, throttle, brake) are often linked through the FlexRay bus system. Gateways are provided to connect subnets of different network protocols to each other via the backbone of the vehicle bus.

FIG. 1 schematically shows an example of an automotive network that is based on a Flexray backbone. Communication gateways GW1, GW2, GW3 are connected to a Flexray backbone. The gateways GW1, GW2, GW3 act as gateways for multiple electronic controlling units ECU1, . . . , ECU6. Gateway GW1 acts as gateway for a Flexray communication with chassis related entities such as electronic controlling unit ECU1 which is responsible for steer-by-wire functionality, and electronic controlling unit ECU2 which is responsible for brake-by-wire functionality. Gateway GW2 acts as gateway for a Flexray communication with powertrain related entities (see also 7100 in FIG. 8) such as electronic controlling unit ECU3 which is responsible for engine control, and electronic controlling unit ECU4 which is responsible for transmission control. Gateway GW3 acts as gateway for a MOST communication with telematics related entities such as electronic controlling unit ECU5 which is responsible for infotainment functionality, and electronic controlling unit ECU6 which is responsible for functionality related to video and phone technology. It is also indicated in FIG. 1 that there may be other gateways and other electronic controlling units for other functionality, such as car body related functionality (see 7200 in FIG. 8) like seat control, door locks, sunroof, etc, and comfort related tasks such as climate control. A diagnostic point DP is foreseen in the Flexray backbone which can be used for the purpose of diagnostics of the communication messages transported on the Flexray backbone FLR.

Figure 2:
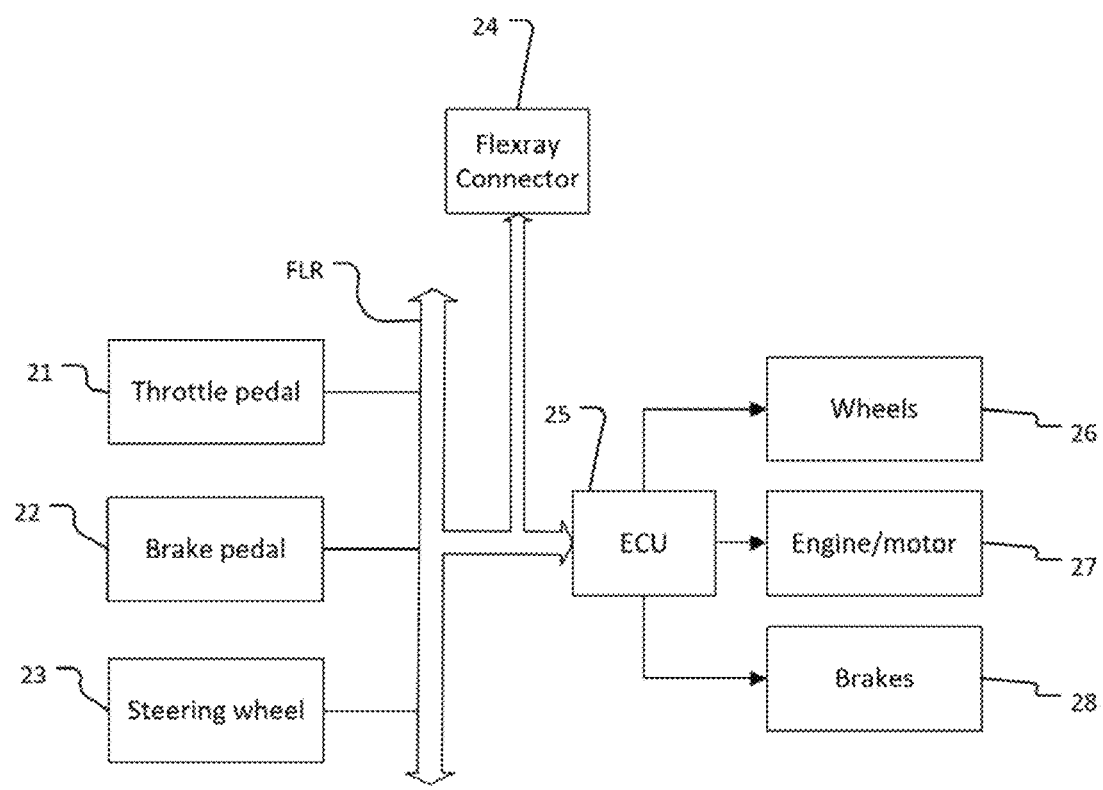
FIG. 2 schematically shows an embodiment of a connector which is configured to detected and read from the backbone the commands (signals) of a x-by-wire system.

FIG. 2 schematically shows an embodiment of a connector which is configured to detected and read from the backbone the commands (signals) of a x-by-wire system. An electronic steering wheel 23 generates messages which comprise steering commands which are transmitted to a control unit 25 via a Flexray backbone FLR. In the control unit 25, the steering commands are processed and then transmitted to actuators of steering wheel 26 via a control line, where they are converted into a movement positioning of the wheels 26. An electronic brake pedal 22 generates messages which comprise braking commands which are transmitted to control unit 25 via the Flexray backbone FLR. In the control unit 25, the braking commands are processed and then transmitted to actuators of brakes 28 via a control line, where they are converted into a movement positioning of the brake system 28. An electronic throttle pedal 21 generates messages which comprise throttle commands which are transmitted to control unit 25 via the Flexray backbone FLR. In the control unit 25, the throttle commands are processed and then transmitted to actuators of an engine/motor 27 via a control line, where they are converted into respective activities of the engine/motor system 27. Flexray connector 24 is configured to detect and read the commands (signals) of the by-wire systems from the communication bus FLR (here e.g. from a FlexRay backbone).

According to the embodiments described below in more detail the commands (signals) of the by-wire systems obtained from a bus connector are used as an input signal for electronic devices such as a gaming environment or a simulation environment while the vehicle itself is not moving. In other words, in a non-driving mode, the commands (signals) of the by-wire systems are intercepted by the bus connector, and at the same time the vehicle components which are conventionally the recipients of these commands are inhibited from interpreting and executing the commands.

The driver may thus use in-vehicle controllers such as an electronic steering wheel, a brake pedal, an electronic transfer switch, handbrake, indicators, etc to control virtual software realities without that the vehicle is actually reacting in reality. Future cars will have more displays, more sensors and more actuators. Especially once the cabin will have displays (or projectors) on the dash board, these can be used for realistic virtual reality applications while the car itself is not moving. Still further, when the user wears smart/AR/VR glasses, the user can be presented with visual and auditory output generated by a gaming or simulation environment that is controlled by commands of the by-wire systems obtained from a bus connector. Generally speaking, future cars will contain ever more sensors, actuators and displays—and these can be used to add functionality to cars and therefore add to their value—not just while driving, but also in non-driving mode, for example for realistic gaming or simulation experiences.

For example, as driving lessons are expensive and time-consuming, and driving lessons in simulators do not offer a realistic enough experience, a simulation environment as described below in the embodiments of FIGS. 3a, b, and c may for example implement an in-car VR driving school. Instead of taking driving classes in a regular car on the road (which may be expensive and dangerous), in driving school's parks (which is expensive and not that realistic) or in simple simulators (which are not realistic enough)—the actual car can be used. According to the technology described in the embodiments, the experience is much more realistic than in an external car simulator as the real car is being used.

As another example, a simulation environment as described below in the embodiments of FIGS. 3a, b, and c may provide "Driving experiences" which can be provided by car manufacturers to customers. For example, drivers can virtually drive on race-tracks or on off-road courses. By using the technology described in the embodiments below, such experiences can be given in a real-car simulator (i.e. virtually) instead of a real driving situation. This may especially be of interest for sports-car manufacturers. Also "driving experiences" often provided by luxury or sports car manufacturers can be done in simulation instead of in real life.

Still further, the described below in the embodiments of FIGS. 3a, b, and c may provide a gaming environment for in-car gaming. Using the technology described in the embodiments, the real car can become part of the game.

Figure 3A:
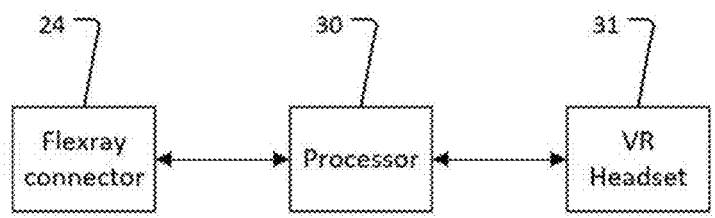
FIG. 3a schematically shows an embodiment where the commands (signals) of by-wire systems obtained by a bus connector are used as an input signal for a VR headset computing environment.

FIG. 3a schematically shows an embodiment where the commands (signals) of by-wire systems obtained by a bus connector are used as an input signal for a VR headset computing environment. A Flexray connector 24 detects and reads the commands (signals) of by-wire systems from a communication bus, e.g. from a Flexray backbone such as described with regard to FIG. 2 in more detail. The commands (signals) are passed on to a processor 30 on which a gaming or simulation application is executed. The gaming or simulation application hosted by processor 30 uses the commands (signals) as input. The gaming or simulation application provided by processor 30 provides its visual and auditory output to a VR headset 31 worn by a vehicle driver which provides an immersive VR visual and auditory presentation to the vehicle driver based on the input command obtained from the Flexray connector 24. The visual output may for example comprise a virtual representation of the environment around a simulated vehicle such as roads, other road users, buildings and landscape, and a virtual representation of a vehicle interior comprising elements such as dashboard, window frames, virtual dashboard screens, etc. The auditory output may for example comprise sounds of a simulated vehicle (motor, gear, etc), sounds of other road users (other cars, trucks, etc.) and environmental sounds (rain, thunder, etc). According to this embodiment, for example the steering wheel, brake and acceleration pedals may be used as input for the gaming or simulation application hosted by processor 30. The processor 30 may for example be the computational unit of either the VR headset (external) or of the car (internal) (see 7600 in FIG. 8). Still further, an external processing unit can be used for computation (such as a notebook connected to the Flexray connector 24, or a cloud system that is in communication with the Flexray connector 24, etc). The output for the user will be the VR headset, optionally in combination with the audio output through the cars sound system (see 34 in FIGS. 3b and 3c). According to this embodiment, the driver can put on the VR headset 31 (or VR glasses) to give him a realistic driving experience while the car stays static.

Figure 3B:
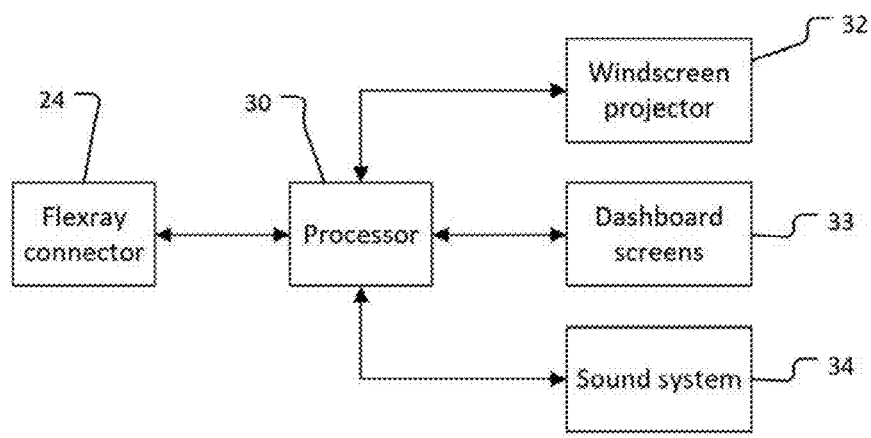
FIG. 3b schematically shows an embodiment where the commands (signals) of by-wire systems obtained by a bus connector are used as an input signal for a windscreen projector computing environment.

FIG. 3b schematically shows an embodiment where the commands (signals) of by-wire systems obtained by a bus connector are used as an input signal for a windscreen projector computing environment. A Flexray connector 24 detects and reads the commands (signals) of by-wire systems from a communication bus, e.g. from a Flexray backbone such as described with regard to FIG. 2 in more detail. The commands (signals) are passed on to a processor 30 on which a gaming or simulation application is executed. The gaming or simulation application provided by processor 30 uses the commands (signals) as input. The gaming or simulation application hosted by processor 30 provides its visual output to a windscreen projector 32 of a vehicle which provides a visual presentation to a vehicle driver based on the input command obtained from the Flexray connector 24. The visual output may for example comprise a virtual representation of the environment around a simulated vehicle such as roads, other road users, buildings and landscape, and a virtual representation of a vehicle interior comprising elements such as dashboard, window frames, virtual dashboard screens, etc. Still further, the gaming or simulation application hosted by processor 30 provides its auditory output to a sound system 34 of the vehicle. The auditory output may for example comprise sounds of a simulated vehicle (motor, gear, etc), sounds of other road users (other cars, trucks, etc.) and environmental sounds (rain, thunder, etc). Still further, the gaming or simulation application hosted by processor 30 provides auxiliary information to dashboard screens 33 of the vehicle. The auxiliary information may for example be information concerning the velocity of a virtual car, or any other information relevant in gaming or simulation applications that is typically displayed on the dashboard screens of a car. According to this embodiment, for example the steering wheel, brake and acceleration pedals may be used as input for the gaming or simulation application hosted by processor 30. The processor 30 may for example be the computational unit of the car (internal) (see 7600 in FIG. 8) or an external processing unit (such as a notebook connected to the Flexray connector 24, or a cloud system that is in communication with the Flexray connector 24, etc) can be used for computation. The sound system 34 for providing the auditory output to the user may for example be a built-in stereo or surround system of the car (see also 7710 in FIG. 8). The windscreen projector 32 which provides the visual output to the driver may be vehicle internal projectors such as a holographic head-up display (HUD). The dashboard screens 33 may be TFT, LCD or OLED screen provided in the dashboard of a car, for example dashboard screens that typically provide information about the velocity of the car, the fuel level, navigation information, warning lights, etc. According to this embodiment, the car's displays can be used with projections to give the user a realistic driving experience while the car stays static.

Figure 3C:
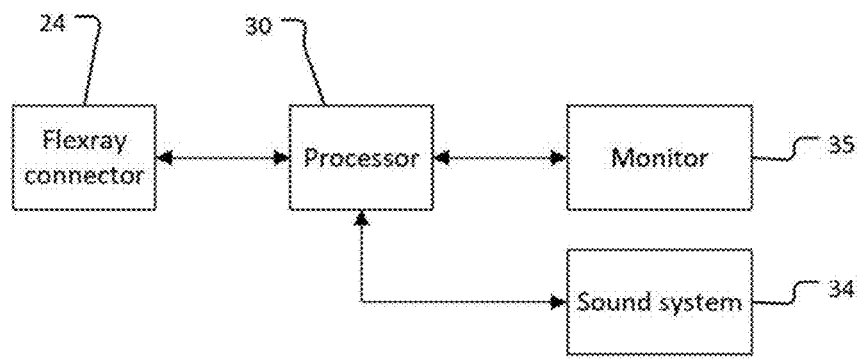
FIG. 3c schematically shows an embodiment where the commands (signals) of by-wire systems obtained by a bus connector are used as an input signal for a computing environment using a monitor next to the driver.

FIG. 3c schematically shows an embodiment where the commands (signals) of by-wire systems obtained by a bus connector are used as an input signal for a computing environment using a monitor next to the driver. A Flexray connector 24 detects and reads the commands (signals) of by-wire systems from a communication bus, e.g. from a Flexray backbone such as described with regard to FIG. 2 in more detail. The commands (signals) are passed on to a processor 30 on which a gaming or simulation application is executed. The gaming or simulation application provided by processor 30 uses the commands (signals) as input. The gaming or simulation application hosted by processor 30 provides its visual output to a monitor 35 which is located next to the driver which provides a visual presentation to the driver based on the input command obtained from the Flexray connector 24. The visual output may for example comprise a virtual representation of the environment around a simulated vehicle such as roads, other road users, buildings and landscape, and a virtual representation of a vehicle interior comprising elements such as dashboard, window frames, virtual dashboard screens, etc. Still further, the gaming or simulation application hosted by processor 30 provides its auditory output to a sound system 34 of the vehicle. The auditory output may for example comprise sounds of a simulated vehicle (motor, gear, etc), sounds of other road users (other cars, trucks, etc.) and environmental sounds (rain, thunder, etc). According to this embodiment, for example the steering wheel, brake and acceleration pedals may be used as input for the gaming or simulation application hosted by processor 30. The processor 30 may for example be the computational unit of the car (internal) (see 7600 in FIG. 8) or an external processing unit (such as a notebook, a cloud system, etc) can be used for computation. The sound system 34 for providing the auditory output to the user may for example be a built-in stereo or surround system of the car. The monitor 35 which provides the visual output to the driver may for example be a large TFT, LCD or OLED display screen positioned in the middle of the dashboard between drive and co-driver. According to this embodiment, the monitor 35 can be used to give the user a driving experience while the car stays static.

By wearing VR glasses or by having built-in projectors projecting images on the windshield, or by using displays, such as described in the embodiments of FIGS. 3a, b and c, the functionality of the car can be used also in a non-driving mode.

Figure 4:
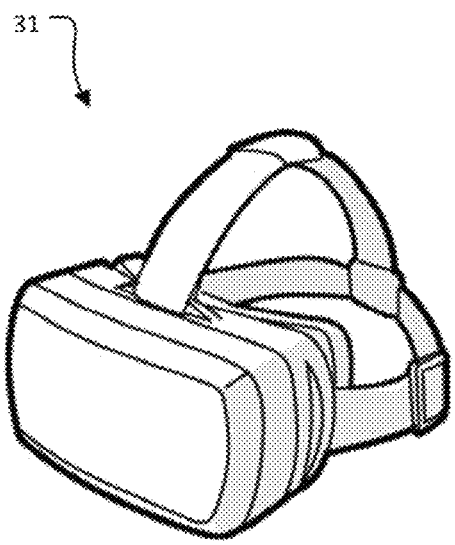

FIG. 4 schematically shows an embodiment of a VR head set 31 used in a computing environment as described with regard to FIG. 3a. The VR head set 31 is configured as a wearable apparatus (an apparatus that can be worn on a human body and has a portable size). The VR head set 31 has a frame for retaining a right image display unit 6a and a left image display unit. The right image display unit and the left image display unit are arranged so as to be positioned in front of a right eye and left eye of the user, respectively. The frame is provided with a sensor of various kinds, an imaging device, a battery, or the like (illustration of these are omitted). On the right image display unit and the left image display unit, for example, an image (actual image) obtained via an imaging device is displayed. By providing the imaging device on an appropriate position of the frame, an image from a viewpoint of the user can be displayed on the right image display unit and the left image display unit. An image supplied from an external computing device (30 in FIG. 3a) may be displayed on the right image display unit and the left image display unit. In this case, space, so-called virtual reality (VR), can be provided to the user.

According to an alternative embodiment, a VR head set of the see-through type may be used. Such VR head sets are also called "glasses". An actual image is perceived by the user according to the see-through principle, whereas an image of virtual objects may be displayed on the right image display unit and the left image display unit. In this case, space, so-called augmented reality (AR), can be provided to the user.

In the following, examples of FlexRay-based data transmission on the protocol level are shown. FlexRay uses cyclic TDMA (Time Division Multiple Access) method for data transmission control. The FlexRay specifications define layer 1 (physical layer) and 2 (data protection layer) of the ISO/OSI reference model. The details of the Flexray communication protocol such as frame format, etc. can be obtained from the Flexray specifications, for example "FlexRay Communications System Protocol Specification", Version 3.0.1.

Figure 5:
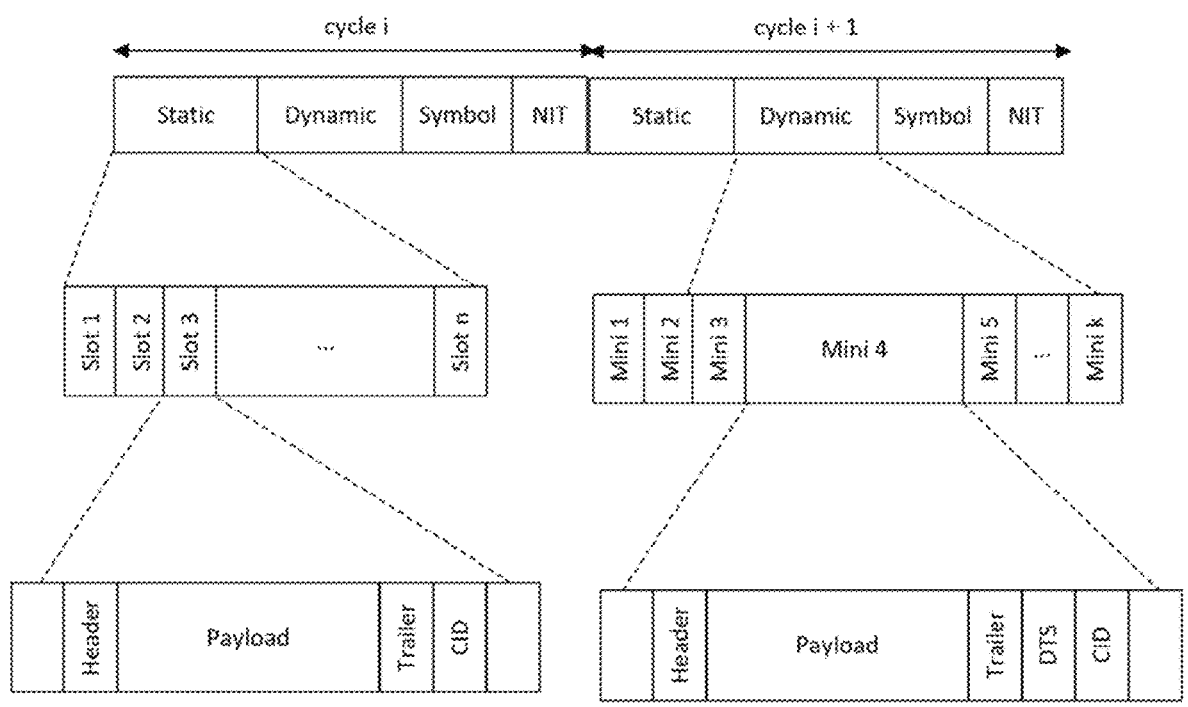
FIG. 5 shows how the communication on the Flexray bus runs in cycles.

FIG. 5 shows how the communication on the Flexray bus runs in cycles. Here a cycle i and an immediately following cycle i+1 are shown. Each cycle is divided into different segments Static, Dynamic, Symbol, NIT. A static segment is divided into slots (Slot 1, . . . Slot n). Each control unit has attributed its specific slot in which it can send messages. If the message is too long for one slot, the next cycle or dynamic segment must be used to continue the message. Important messages (e.g. information from x-by-wire systems such as steering and brake) are typically transmitted in such deterministic slots which are transmitted within a predefined and known time. A dynamic segment is divided into minislots (Mini 1, . . . Mini k). A minislot can have a dynamic length. Here, for example, minislot Mini 4 of is longer than the other Minislots. The minislots of the dynamic segment can for example be used by an ECU if it wants to send longer or additional messages, for example if the width of a static slot is not sufficient or is needed for more important messages. The Segment NIT (Network Idle Time) is used by ECUs to synchronize with the bus, and the segment Symbol is foreseen for testing purposes.

The messages or data packets that are sent by an ECU over the Flexray bus include a Header, the actual user data Payload, and a Trailer. Furthermore, the time period of each time slot that cannot be used for payload data can include a "Channel Idle Time" (CIT) and a "Channel Idle Delimiter" (CID). In minislots of dynamic segments a frame may further comprise a "Dynamic Trailing Sequence" field (DTS) which helps in lining up minislots.

A Header comprises metadata related to the payload data, such as a "Payload preamble indicator", a "Null frame indicator" which indicates whether the payload is regular or invalid, a "Sync frame indicator" which indicates whether messages transmitted in a static segment are used in the context of synchronization, a "Start frame indicator" which indicates whether the message transmitted in the static segment is being used as a startup frame in the context of startup, a "Frame ID" which identifies a message and corresponds to the slot, a "Payload length" which shows the size of the payload, a "Header CRC" for cyclic redundancy checks, and a "Cycle count" which indicates the cycle number of the segment. Also the Trailer comprises CRC data for cyclic redundancy checks.

To detect and read messages transmitted by a x-by-wire system, the payload data is read via a Flexray connector as described with regard to FIGS. 3a, b, c.

In the following an AUTOSAR-based Steer-by-wire system that operates over Flexray is provided as an example. Such an exemplifying scenario is described in more detail by Chaaban, Khaled & Leserf, Patrick & Saudrais, Sébastien. (2009) in "Steer-By-Wire system development using AUTOSAR methodology" 1-8. 10.1109/ETFA.2009.5347123.

AUTOSAR provides a set of specifications that describe basic software modules, define application interfaces and create a common development methodology based on a standardized exchange format. Software modules provided by the AUTOSAR Layered Software Architecture can be used in any vehicles and any electronic components. An AUTOSAR system consists of software components (SWCs) communicating and interacting through a Virtual Functional Bus (VFB). The software components SWC are then mapped to specific control units (ECU) distributed over a network, in the example here a Flexray bus. Software components communicate using ports and their interfaces. An interface may be of sender/receiver, client/server or calibration type. Further, a SWC may be one of the three types: Sensor/Actuator, Application or Calibration type. The Virtual Functional Bus (VFB) concept allows a virtual integration of the system independently of underlying software and hardware.

A physical steer-by-wire architecture comprises the hand wheel (steering), ECUs, and the road wheels. The distributed ECUs are connected using a Flexray network.

Figure 6:
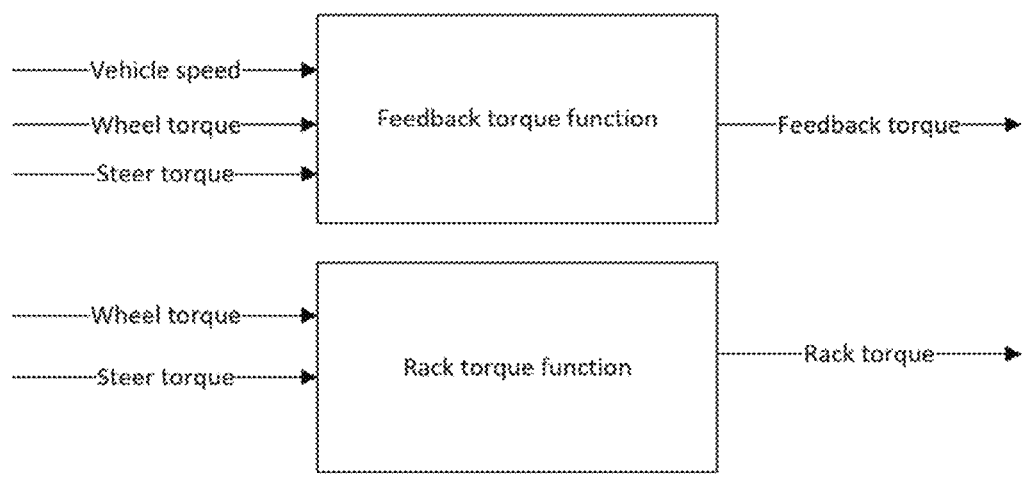
FIG. 6 provides an embodiment of a functional diagram of a steer-by-wire system.

FIG. 6 provides an embodiment of a functional diagram of a steer-by-wire system. The steer-by-wire system is composed of a feedback torque function and a rack torque function. From the wheel torque and the steer torque, the rack torque function computes the rack torque which controls the front axle actuator of the front wheels. From the vehicle speed, the wheel torque, and the steer torque, the feedback torque function computes the feedback torque which describes the feedback force applied to the steering wheel so that the driver feels the effect of tuning the wheels.

Figure 7:
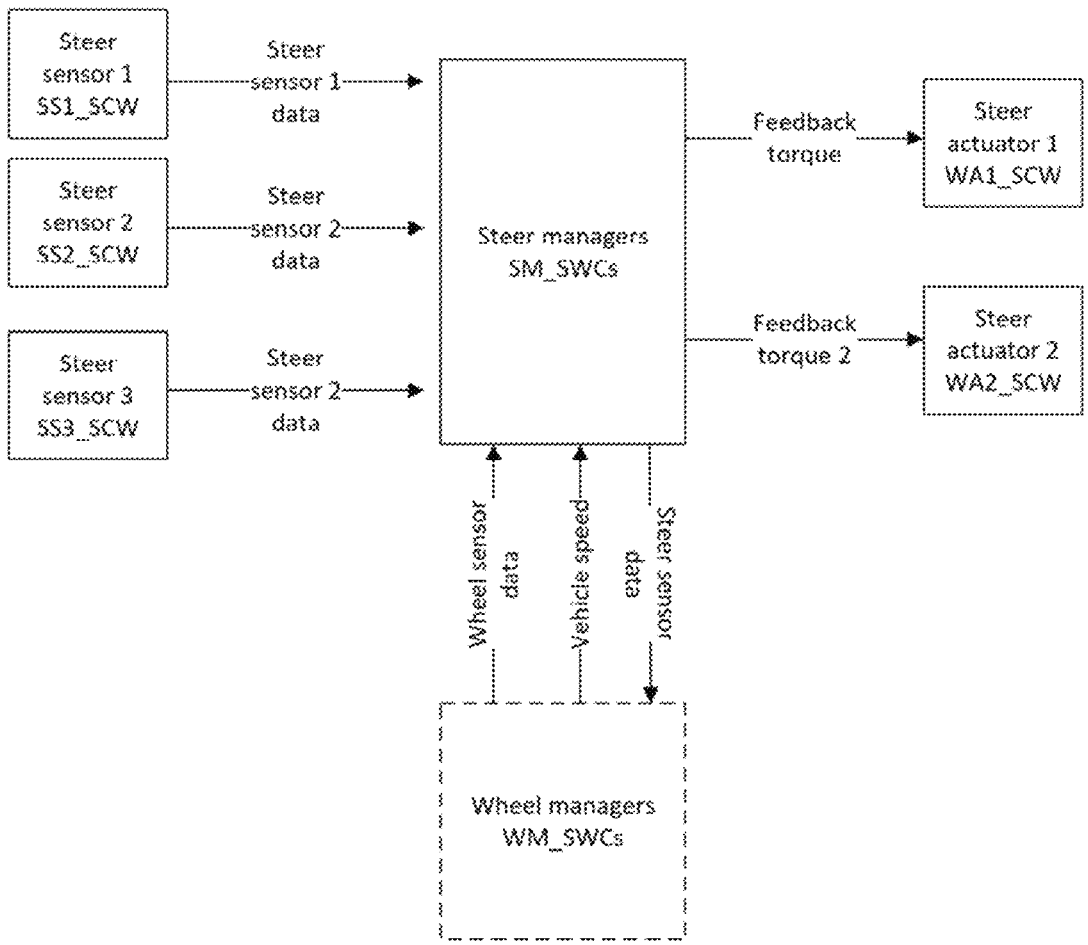
FIG. 7 shows an exemplifying software architecture of an AUTOSAR-based steer-by-wire system.

FIG. 7 shows an exemplifying software architecture of an AUTOSAR-based steer-by-wire system. This schematic diagram is based on the example provided in FIG. 9 of the publication "Steer-By-Wire system development using AUTOSAR methodology" cited above. A first steer sensor software component SS1_SWC sends, via the Virtual Functional Bus (VFB), SteerSensor1_data to steer manager software components SM_SWCs. A second steer sensor software component SS2_SWC sends, via the Virtual Functional Bus (VFB), SteerSensor2_data to the steer manager software components SM_SWCs. A third steer sensor software component SS3_SWC sends, via the Virtual Functional Bus (VFB), SteerSensor3_data to the steer manager software components SM_SWCs. The steer manager software components SM_SWCs send, via the Virtual Functional Bus (VFB), FeedbackTorque 1 data to a first steer actuator software component SA1_SCW. The steer manager software components WM_SWCs further send, via the Virtual Functional Bus (VFB), SteerTorque 2 data to a second steer actuator software component SA1_SCW. The communication interfaces of the software components (SWCs) are for example realized according to the AUTOSAR sender/receiver type defined in the AUTOSAR Specification of the Virtual Functional Bus V1.3.0 R3.2 Rev 2. The steer manager software components SM_SWC are also connected, via the Virtual Functional Bus (VFB), to wheel manager software components WM_SWCs to exchange additional data such as wheel sensor data and rack torque data (not shown) in FIG. 1.

According to the AUTOSAR sender/receiver communication mechanism, the software components (SWC)s communicate with each other via communication interfaces and ports. During the design of an AUTOSAR system, ports of components that need to communicate with each other are hooked up using assembly-connectors. An SWC can broadcast data through a sender port (SPort), and another SWC can collect it using a receiver port (RPort). An assembly-connector connects one RPort with one PPort. For the case of sender-receiver communication, the presence of an assembly-connector represents the fact that the data generated by the PPort on the connector is transmitted to the RPort. With this method of communication, the data from the sender will be stored on the Run Time Environment (RTE). Any appropriate receiver port defined in the application layer is free to read this data from the RTE. In other words, these ports don't care who writes the information and who reads it. This mechanism of AUTOSAR is that the same ports which communicate within one controller can be used to communicate with other controllers as well. That is, a simulation or gaming environment may define in the AUTOSAR Run-Time Environment an additional assembly-connector that defines an Rport for the simulation or gaming environment that hooks up to a PPort of a sensor SWC such as the software components SS1_SWC and SS2_SWC of the steer sensors of FIG. 6 to intercept the data elements provided by these software components SS1_SWC and the SS2_SWC.

The AUTOSAR Run-Time Environment has the responsibility to route information that is coming from or going to remote components. The corresponding connectors between the components are implemented by intra- or inter-ECU communication mechanisms. That is, according to an alternative embodiment, the intra- or inter-ECU communication may be directly intercepted on the ECU communication level defined in the connectors to intercept the data elements provided by the software components.

According to the embodiments, in a non-driving mode ("VR-mode"), data related to this exemplifying AUTOSAR type data communication between the software components is detected and read by a processor (30 in FIGS. 3a, b, c) from the Flexray payloads obtained via a Flexray connector (24 in FIGS. 3a, b, c) and the AUTOSAR communication data is analyzed according to the principles set out above to detect and read for example the data elements SteerSensor1_data, SteerSensor2_data, SteerSensor3_data. This data SteerSensor1_data, SteerSensor2_data, SteerSensor3_data may then be evaluated by a simulation or gaming environment (realized for example by processor 30 in FIGS. 3a, b, c) for controlling a virtual vehicle. Still further, the simulation or gaming environment may replace the rack torque function implemented in the steer manager software components SM_SWCs and determine own FeedbackTorque data which is appropriate for the driving situation of the virtual car simulated by the simulation or gaming environment. The simulation or gaming environment may then send this own FeedbackTorque data to the steer actuator software components SA_SWC1, SA_SWC2. The AUTOSAR mechanism related to the steer actuator software components SA_SWC1, SA_SWC2 will then translate the received data onto the physical layer to control the physical hand wheel (steering) in an appropriate way that reflects the driving situation of the virtual car simulated by the simulation or gaming environment. Still further, in the non-driving mode ("VR-mode"), the system may not only intercept the messages containing the SteerSensor1_data, SteerSensor2_data, SteerSensor3_data but also deactivate the functionality of the wheel manger and steer manager software components WM_SCWs in order to avoid that the standard driving-mode functionality of the vehicle is invoked by these messages. Alternatively or in addition, the system may inhibit the transmission of this data to the managing components in order to avoid that the standard driving-mode functionality of the vehicle is invoked by these messages.

This may for example be realized by changing the designated receiver specified in the messages of the steering wheel/brakes/accelerator software components from the standard managers ("wheels/motor/brakes", etc.) to the software and gaming environment ("VR-Wheels/VR-motor/VR-brakes"). In such a setting, the software and gaming environment (VR-setting) could for example be a full flexray-node receiving data from the resptive input devices.

In the embodiments described above, a Flexray/AUTOSAR implementation was described in an exemplary way. However, other implementations using other protocols can be conceived by the skilled person such as CAN etc. The general principles described above will remain the same in such alternative embodiments.

The technology according to the embodiments of the present disclosure is applicable to various vehicles such as cars, trucks, boats, ships, and the like.

Figure 8:
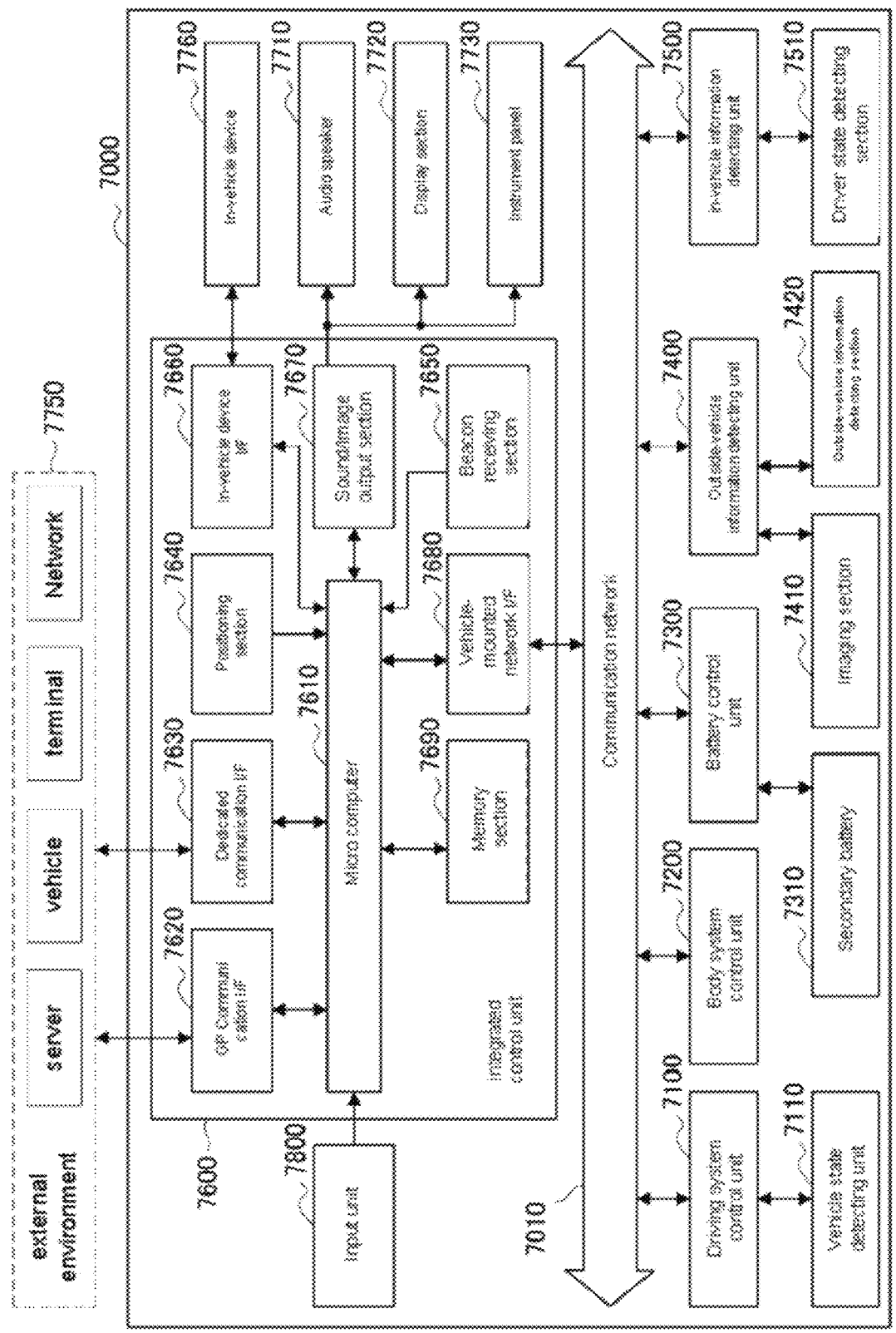
FIG. 8 is a block diagram depicting an example of schematic configuration of a vehicle control system as an example of a system to which the technology according to the embodiments of the present disclosure can be applied.

FIG. 8 is a block diagram depicting an example of schematic configuration of a vehicle control system 7000 as an example of a system to which the technology according to the embodiments of the present disclosure can be applied. The vehicle control system 7000 includes a plurality of electronic control units connected to each other via a communication network 7010. The communication network 7010 may for example correspond to the Flexray communication bus described in the embodiment of FIGS. 1 and 2. The technical teaching of the embodiments described with regards to FIGS. 1 to 4 above is not restricted to the entities described there in more detail. A bus connector (24 in FIGS. 2, and 3) as described above might as well detect and read any information communicated on the communication network 7010 displayed in FIG. 8, related to any of the input and output devices shown in FIG. 8.

In the example depicted in FIG. 8, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 8 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting fog, a sunshine sensor detecting a degree of sunshine, and a snow sensor detecting snowfall. The peripheral information detecting sensor may be at least one of an ultrasonic sensor, a radar device, and a LiDAR device (Light Detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

The outside-vehicle information detecting unit 7400 causes the imaging section 7410 to produce an image of the outside of the vehicle, and receives produced image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing rain, fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information on the driver, a microphone that collects sound within the interior of the vehicle, or the like. The biosensor is, for example, disposed in a seat surface, the steering wheel, or the like, and detects biological information on an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), world-wide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such as, for example, wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal Handy-phone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which causes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

In particular, the microcomputer 7610 may implement the simulation and/or gaming application (30 in FIGS. 3a, b, c) as described in the embodiments above.

The sound/image output section 7670 transmits an output signal of at least one of a sound and an image to an output device capable of visually or acoustically notifying an occupant of the vehicle or the outside of the vehicle. In the example of FIG. 8, an audio speaker 7710 (e.g. sound system 34 in FIGS. 3b, c), a display section 7720 (monitor 35 in FIG. 3c), and an instrument panel 7730 (33 in FIG. 3b) are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and acoustically outputs the analog signal.

According to the embodiment of FIG. 3a, a AR/VR headset (31 in FIG. 3a) is connected to integrated control unit 7600 as additional output device. That is, the functionality of the audio speaker 7710, and of the display section 7720 can be replaced by entities in the AR/VR headset.

Incidentally, at least two control units connected to each other via the communication network 7010 in the example depicted in FIG. 8 may be integrated into one control unit. Alternatively, each individual control unit may include a plurality of control units. Further, the vehicle control system 7000 may include another control unit not depicted in the figures. In addition, part of or all the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions described in this disclosure can be implemented in integrated control unit 7600, or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

In addition, at least part of the constituent elements of the integrated control unit 7600 described with reference to FIG. 8 may be implemented in a module (for example, an integrated circuit module formed with a single die) for the integrated control unit 7600 depicted in FIG. 8. Alternatively, the integrated control unit 7600 described with reference to FIG. 8 may be implemented by a plurality of control units of a vehicle control system as depicted in FIG. 8.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be noted that the embodiments describe methods with an exemplary order of method steps. The specific order of method steps is, however, given for illustrative purposes only and should not be construed as binding.

It should also be noted that the division of the control or circuitry of FIG. 8 into units is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to detect and read commands of a x-by-wire system (ECU1, ECU2, 25) from a communication bus (FLR) and to use the commands of the x-by-wire system (ECU1, ECU2, 25) as an input for an electronic gaming or simulation device (30).

(2) The electronic device of (1), wherein the circuitry provides a non-driving mode in which the commands of the by-wire systems are detected and read by the bus connector, and at the same time the vehicle components which are conventionally the recipients of these commands are inhibited from interpreting and executing the commands.

(3) The electronic device of (1) or (2), wherein the commands of the x-by-wire system (ECU1, ECU2, 25) are used as input for a simulation or gaming environment (30).

(4) The electronic device of any one of (1) to (3), wherein the circuitry comprises a bus connector (24) configured to detect and read the commands of the x-by-wire system (ECU1, ECU2, 25) from the communication bus (FLR).

(5) The electronic device of any one of (1) to (4), wherein the commands of the x-by-wire system (ECU1, ECU2, 25) are used as an input for a computing environment (30) comprising a AR/VR headset (31) for visual and auditory output.

(6) The electronic device of any one of (1) to (5), wherein the commands of the x-by-wire system (ECU1, ECU2, 25) are used as an input for a computing environment (30) comprising a monitor (35) positioned next to the driver for visual output.

(7) The electronic device of any one of (1) to (6), wherein the commands of the x-by-wire system (ECU1, ECU2, 25) are used as an input for a computing environment (30) comprising a windscreen projector (32) for visual output.

(8) The electronic device of any one of (1) to (7), wherein the commands of the x-by-wire system (ECU1, ECU2, 25) are used as an input for a computing environment comprising dashboard screens (33) for visual output and/or a in-car sound system (34) for auditory output.

(9) The electronic device of any one of (1) to (8), wherein the communication bus (FLR) is a FlexRay bus.

(10) The electronic device of any one of (1) to (9), wherein the x-by-wire system (ECU1, ECU2, 25) comprises electrical or electro-mechanical systems (26, 27, 28) for performing vehicle functions.

(11) The electronic device of any one of (1) to (10), wherein the x-by-wire system (ECU1, ECU2, 25) comprises a steer-by-wire system (ECU1), a brake-by-wire system (ECU2), or a throttle-by-wire system.

(12) The electronic device of any one of (1) to (12), wherein the commands comprise steering commands which are transmitted to a control unit (25) via a communication bus (FLR) and which are converted into a movement positioning of the wheels (26) of a car, or braking commands which are transmitted to control unit (25) and converted into a movement positioning of the brake system (28) of a car, or throttle commands which are transmitted to a control unit (25) and converted into activities of the engine/motor system (27) of a car.

(13) The electronic device of any one of (1) to (12), wherein the electronic gaming or simulation device (30) is a computational unit of the car, the computational unit of a VR headset, or an external processing unit.

(14) A method comprising detecting and reading commands of a x-by-wire system (ECU1, ECU2, 25) from a communication bus (FLR) and using the commands of the x-by-wire system (ECU1, ECU2, 25) as an input for an electronic gaming or simulation device (30).

(15) A computer program comprising instructions which when, carried out on a processor, cause the processor to detect and read commands of a x-by-wire system (ECU1, ECU2, 25) from a communication bus (FLR) and to use the commands of the x-by-wire system (ECU1, ECU2, 25) as an input for an electronic gaming or simulation device (30).

The invention claimed is:

1. An electronic device, comprising:
   circuitry configured to
   detect and read commands of a x-by-wire system from a communication bus, and
   use the commands of the x-by-wire system as an input for simulation of the commands,
   wherein, during the simulation, the circuitry is further configured to
   intercept, by a bus connector, the commands of the x-by-wire system, the intercepted commands being detected and read by the bus connector,
   execute the intercepted commands in a non-driving mode of a vehicle, and
   at a same time, deactivate vehicle components which are conventionally the recipients of these commands, the deactivated vehicle components being inhibited from interpreting and executing the commands.

2. The electronic device of claim 1, wherein the commands of the x-by-wire system used for the simulation correspond to inputs for an electronic game.

3. The electronic device of claim 1, wherein the commands of the x-by-wire system are used as an input for a computing environment comprising an AR/VR headset for visual and auditory output.

4. The electronic device of claim 1, wherein the commands of the x-by-wire system are used as an input for a computing environment comprising a monitor positioned next to the driver for visual output.

5. The electronic device of claim 1, wherein the commands of the x-by-wire system are used as an input for a computing environment comprising a windscreen projector for visual output.

6. The electronic device of claim 1, wherein the commands of the x-by-wire system are used as an input for a computing environment comprising dashboard screens for visual output and/or an in-car sound system for auditory output.

7. The electronic device of claim 1, wherein the communication bus is a FlexRay bus.

8. The electronic device of claim 1, wherein the x-by-wire system comprises electrical or electro-mechanical systems for performing vehicle functions.

9. The electronic device of claim 1, wherein the x-by-wire system comprises a steer-by-wire system, a brake-by-wire system, or a throttle-by-wire system.

10. The electronic device of claim 1, wherein the commands comprise steering commands which are transmitted to a controller via the communication bus and which are converted into a movement positioning of the wheels of a car, or braking commands which are transmitted to the controller and converted into a movement positioning of the brake system of a car, or throttle commands which are transmitted to the controller unit and converted into activities of the engine/motor system of a car.

11. The electronic device of claim 1, wherein at least a portion the simulation is performed in processing circuitry of a car, processing circuitry of a VR headset, or an external processor.

12. A method comprising:
   detecting and reading commands of a x-by-wire system from a communication bus;
   using the commands of the x-by-wire system as an input for simulation of the commands;
   intercepting, by a bus connector, the commands of the x-by-wire system, the intercepted commands being detected and read by the bus connector;
   executing the intercepted commands in a non-driving mode of a vehicle; and
   at a same time, deactivating vehicle components which are conventionally the recipients of these commands, the deactivated vehicle components being inhibited from interpreting and executing the commands.

13. A non-transitory computer-readable storage medium storing computer-readable instructions thereon which, when executed by a computer, cause the computer to perform a method, the method comprising:
   detecting and reading commands of a x-by-wire system from a communication bus; and
   using the commands of the x-by-wire system as an input for simulation of the commands;
   intercepting, by a bus connector, the commands of the x-by-wire system, the intercepted commands being detected and read by the bus connector;
   executing the intercepted commands in a non-driving mode of a vehicle; and
   at a same time, deactivating vehicle components which are conventionally the recipients of these commands, the deactivated vehicle components being inhibited from interpreting and executing the commands.

* * * * *